(12) United States Patent
Beamish (10) Patent No.: US 9,926,959 B2
(45) Date of Patent: Mar. 27, 2018

(54) INTERLOCKING DEVICE FOR GROUND COVER MATS

(71) Applicant: Shawn Beamish, Edmonton (CA)

(72) Inventor: Shawn Beamish, Edmonton (CA)

( * ) Notice: Subject to any disclaimer, the term of this patent is extended or adjusted under 35 U.S.C. 154(b) by 361 days.

(21) Appl. No.: 14/378,265

(22) PCT Filed: Feb. 22, 2013

(86) PCT No.: PCT/CA2013/050137
§ 371 (c)(1),
(2) Date: Aug. 12, 2014

(87) PCT Pub. No.: WO2013/123601
PCT Pub. Date: Aug. 29, 2013

(65) Prior Publication Data
US 2015/0013119 A1    Jan. 15, 2015

Related U.S. Application Data

(60) Provisional application No. 61/601,861, filed on Feb. 22, 2012.

(51) Int. Cl.
*F16B 5/06* (2006.01)
*F16B 7/04* (2006.01)
(Continued)

(52) U.S. Cl.
CPC ............ *F16B 5/0635* (2013.01); *E01C 5/005* (2013.01); *E01C 9/08* (2013.01); *E04B 5/023* (2013.01); *E04F 15/02* (2013.01); *F16B 7/0433* (2013.01); *Y10T 24/44077* (2015.01); *Y10T 29/49826* (2015.01)

(58) Field of Classification Search
CPC ...... F16B 5/0635; F16B 7/0433; E04B 5/023; E01C 5/005; Y10T 24/44291; Y10T 24/44368; Y10T 24/44376; Y10T 24/44385; Y10T 24/44402; Y10T 24/4441; Y10T 24/44419; Y10T 24/44427; Y10T 24/44436; Y10T 24/44453;
(Continued)

(56) References Cited

U.S. PATENT DOCUMENTS 3,348,459 A    9/1967  Harvey
3,572,224 A    3/1971  Perry
(Continued)

FOREIGN PATENT DOCUMENTS

CA    2414518    7/2004
CA    2528749    6/2007
JP    10121717   5/1998

*Primary Examiner* — Abigail Troy
(74) *Attorney, Agent, or Firm* — Bennett Jones LLP (57) ABSTRACT

The invention is directed to an interlocking device for releasably connecting ground a first and a second ground cover mats each having tubular members. The device includes two clamping arms and a securing means. The clamping arms each have a collar member to engage one of the tubular members. The collar members are adjustably connected to each other to move the device from an open installation position into a closed restraining position in which the concave surfaces restrain the tubular members and are opposed to each other. The securing means releasably locks the clamping arms in the closed restraining position.

2 Claims, 12 Drawing Sheets

(51) Int. Cl.
*E01C 9/08* (2006.01)
*E01C 5/00* (2006.01)
*E04B 5/02* (2006.01)
*E04F 15/02* (2006.01)

(58) Field of Classification Search
CPC ......... Y10T 24/44496; Y10T 24/44513; Y10T 24/44521; Y10T 24/4453; Y10T 24/44538
See application file for complete search history.

(56) References Cited

U.S. PATENT DOCUMENTS

| | | |
|---|---|---|
| 4,594,829 A | 6/1986 | Herrgord |
| 7,918,829 B2 * | 4/2011 | Daniels, Jr. ........... A61M 25/02 604/164.04 |
| 2010/0209187 A1 | 8/2010 | Relland et al. |

* cited by examiner

INTERLOCKING DEVICE FOR GROUND COVER MATS

CROSS REFERENCE TO RELATED APPLICATION

This application claims the benefit of and is the National Phase Entry of International Application Number PCT/CA2013/050137 filed Feb. 22, 2013, which claims the benefit of U.S. Provisional Patent Application No. 61/601,607 filed Feb. 22, 2012, which is hereby incorporated by reference in its entirety".

FIELD OF THE INVENTION

The present invention relates to an interlocking device for ground cover mats.

BACKGROUND OF THE INVENTION

In the oil and gas industry, ground cover mats are used to temporarily support heavy equipment and transport trucks over wet or disturbed ground in remote locations. These mats tend to have a high weight per area and need to cover significant areas. Accordingly, the mats are provided in manageable sizes and weights, transported to remote locations, interlocked together for use, and thereafter disassembled.

Prior art interlocking systems for ground cover mats or panels are disclosed in U.S. Pat. Nos. 3,348,459, 3,572,224, and 4,594,829. These systems rely on intricately shaped connectors formed on the edges of the mats or panels for interlocking effect. Besides the need to specifically adapt the mats for these connectors, such systems have other potential limitations. First, it is difficult to engineer the connectors with sufficient strength to support heavy equipment. Second, the connectors may become inoperable if clogged with dirt or deformed under loading. Third, the abutting edges of the mats must be precisely aligned to mate the connectors. Finally, the connectors do not readily accommodate relative rotation of the mats as may be expected on soft ground surfaces.

Accordingly, there is thus a need in the art for an interlocking system for ground cover mats that mitigates the deficiencies of the prior art.

SUMMARY OF THE INVENTION

In general terms, the present invention provides an interlocking device for releasably connecting two adjacent ground cover mats, each of the mats having a tubular member.

In one aspect, the invention may comprise an interlocking device for releasably connecting two abutting ground cover mats, each of the mats having a tubular member, the device comprising:
(a) a first clamping arm comprising a first curved collar member and a first plate;
(b) a second clamping arm comprising a second curved collar member and a second plate;
(c) wherein the first and second clamping arms moveably engage each other to move between an open installation position and a closed restraining position where the first and second plates are substantially co-planar with the mats, and the first and second curved collar members are opposed to each other to restrain the tubular members of the abutting mats; and
(d) means for securing the first and second clamping arms in the closed restraining position.

In one embodiment, the device may further comprise a hinge pin, wherein one or both of the first and second clamping arms pivot about the hinge pin. In another embodiment, the second clamping arm may slideably engage the first clamping arm. In another embodiment, the first clamping arm is fixed to a base, and the second clamping arm is pivotally attached to the base.

In one embodiment, the device may be used in releasably connecting four rectangular ground cover mats arranged in a two-by-two array, each mat comprising a tubular member such that each tubular member is co-axial with another tubular member of an adjacent mat, and is parallel to another tubular member of an abutting mat, wherein the first curved collar member restrains two adjacent tubular members, and the second curved collar member restrains the other two adjacent tubular members.

In one aspect, the invention may comprise an interlocking device for releasably connecting two adjacent ground cover mats, each of the mats having a tubular member, the device comprising:
(a) a first clamping arm comprising a first curved collar member and a first plate;
(b) a second clamping arm comprising a second curved collar member and a second plate; and
(c) a hinge pin, wherein the first and second clamping arms are pivotally attached to the hinge pin to pivot between an open installation position and a closed restraining position where the first and second plates are substantially co-planar, and the first and second curved collar members are opposed to each other to restrain the tubular members of the abutting mats; and
(d) wherein the first and second clamping arms are configured to clamp the first and second collar members against and frictionally engage the tubular members to remain in the closed restraining position.

In one embodiment, one or both of the curved collar members is flexibly resilient.

In another aspect, the invention may comprise a ground cover mat system comprising:
(a) at least four ground cover mats, each having a tubular member disposed at an end of the mat, and wherein the mats may be arranged in a two-by-two array such that each tubular member is co-axial with another tubular member of an adjacent mat, and is parallel to another tubular member of an abutting mat, and the mats collectively define a mat opening exposing the tubular members; and
(b) an interlocking device having opposing collar members for restraining the at least four tubular members, wherein the interlocking device comprises a plate shaped and sized to substantially fill the mat opening.

In another aspect, the invention may comprise a method of interconnecting two abutting ground cover mats, each mat having an exposed tubular member disposed at an end of the mat, comprising the step of restraining the tubular members with a interlocking device as described herein. In one embodiment, the method comprises interconnecting four adjacent and abutting ground cover mats, in a two-by-two configuration, with a single device.

BRIEF DESCRIPTION OF THE DRAWINGS

The invention will now be described by way of an exemplary embodiment with reference to the accompanying simplified, diagrammatic, not-to-scale drawings.

DETAILED DESCRIPTION OF PREFERRED EMBODIMENTS

The present invention relates to an interlocking device for ground cover mats, a system of releasably connectable ground cover mats and a method for interconnecting ground cover mats. When describing the present invention, all terms not defined herein have their common art-recognized meanings. To the extent that the following description is of a specific embodiment or a particular use of the invention, it is intended to be illustrative only, and not limiting of the claimed invention. The invention will now be described having regard to the accompanying Figures.

As used herein, the term "tubular member" refers to any member having a cross-sectional shape that is translated along its length. The cross-sectional shape of the tubular member may be, without limitation, an ellipse, a circle, or a polygon. The cross-section of the tubular member may be either solid or hollow.

As used herein, the term "abutting ground cover mats" shall mean two mats which are in an end-to-end relationship, where end tubular members of each mat are parallel to each other. The term "adjacent ground cover mats" shall mean two mats which are side-by-side, where end tubular members of each mat are substantially co-axial to each other.

FIGS. 1A to 1E show one embodiment of the device (10) of the present invention. In one embodiment, the device (10) comprises a hinge pin (22), a securing means (30), and a first and second clamping arm (40, 50). Each of the foregoing elements may be constructed from any material or combination of materials having suitable properties such as mechanical strength, ability to withstand cold and adverse field conditions, corrosion resistance, and ease of machining, casting or fabrication. Non-limiting examples of suitable materials include forged steel, hardened steel, stainless steel, aluminium, and metal alloys.

The hinge pin (22) is a substantially cylindrical rod having a central axis. Retaining cap (24) may be secured to the terminal ends of the rod (22) by any suitable means of connection, such as a threaded connection. In the embodiments shown in FIGS. 1A to 1D, the hinge pin (22) is a single cylindrical rod that spans across the slots (49, 59). In other embodiments not shown, the hinge pin (22) maybe divided into two segments on either side of the slots (49, 59).

In alternative embodiments, the first and second clamping arms (40, 50) may engage each other to be pivotally moveable without the use of a hinge pin.

Figure 1A:
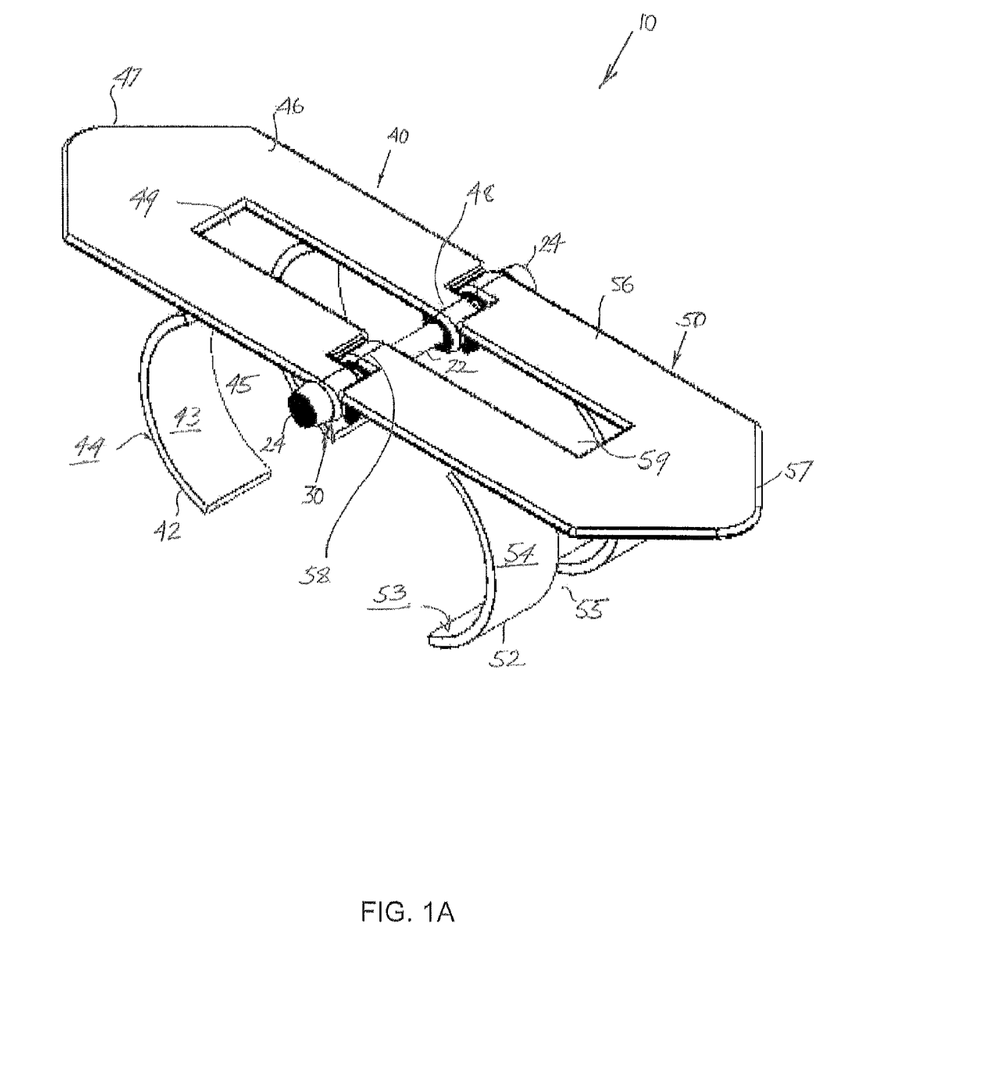
FIGS. 1A, 1B, 1C, and 1D are a perspective view, top view, elevation view, and side view, respectively, of one embodiment of the device of the present invention having securing means in the form of a cam and groove.
Figure 1B:
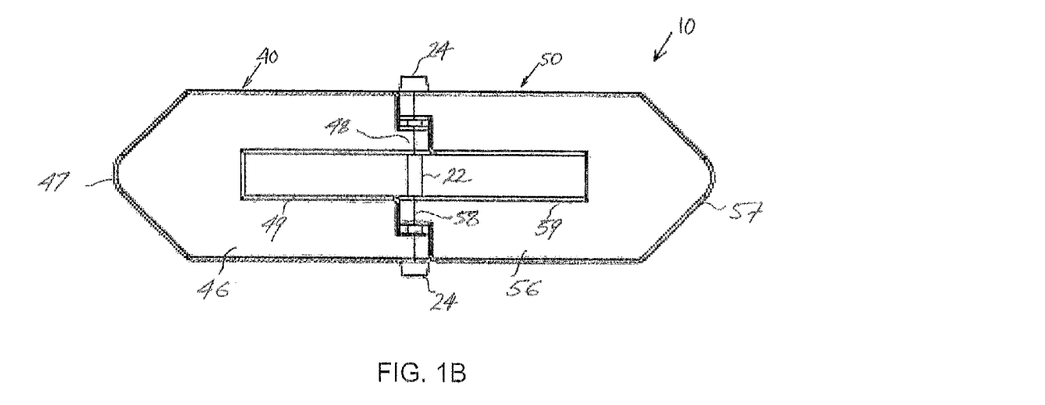
Figure 1C:
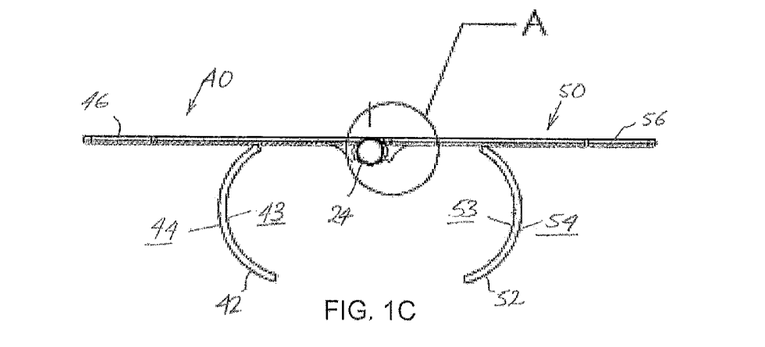
Figure 1D:
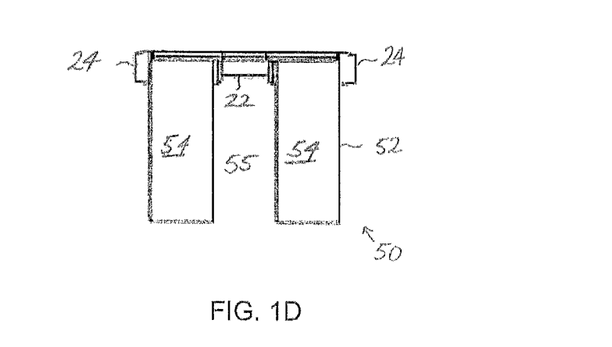

In one embodiment, each of the clamping arms (40, 50) comprises a curved collar member (42, 52). Each of the collar members has a concave surface (43, 53) on one side, a convex surface (44, 54) on the reverse side. In one embodiment, each collar member is split into two members, separated by a slot (45, 55). The concave surfaces (43, 53) are shaped to engage the tubular members in the sense that when the concave surfaces (43, 53) contact the tubular members, the concave surfaces (43, 53) restrict movement of the tubular member in both the horizontal and vertical directions. Referring to FIG. 1C, a tubular member embraced by concave surface (43) will be restricted against moving vertically and horizontally to the left. Similarly, a tubular member embraced by concave surface (53) will be restricted against moving vertically and horizontally to the right. The slot (45, 55) is sized to permit the passage of vertical flanged caps of the mats, as will be described further below.

The collar members may be curved with a circular radius, to match tubular members having a circular cross-section. The collar members may have alternative shapes, but should preferably have a vertical portion which restrains horizontal movement of the tubular member, and a horizontal portion which restrains vertical movement of the tubular member.

In one embodiment, each of the clamping arms (40, 50) comprises a plate (46, 56) to which the curved collar members (42, 52) are attached. Each of the plates (46, 56) has a first end (47, 57) and a second end (48, 58) and a slot (49, 59). Each of the first ends (47, 57) may be tapered to fit within a mat opening defined by adjacent mats, as will be described below. The plate (46, 56) may have a different shape than the shape shown to fit into different shaped openings defined by abutting mats.

The clamping arms (40, 50) move between an open installation position and a closed restraining position. As used herein, the "closed restraining position" refers to a configuration of the device (10) in which the plates (46, 56) are substantially coplanar with each other, and the first and second collar curved members (42, 52) are opposed to each other to restrain tubular members of abutting mats. In the embodiment shown in FIGS. 1A to 1D, this pivotal attachment is achieved by the second ends (48, 58) of the plates (46, 56) being bent in a hook-shape around the hinge pin (22) so as to be pivotable about the central axis of the hinge pin (22). The retaining caps (24) are secured to the ends of the hinge pin (22) to retain the plates (46, 56) on the hinge pin (22). In one embodiment, the clamping arms (40, 50) are opposed and symmetric about the hinge pin (22). Each of the slots (49, 59) is shaped to permit the passage of vertical flanged caps of the mats, as will be explained below. The slots (49, 59) may have a different shape than the shape to accommodate different types of flanged caps.

The securing means (30) functions to releasably lock or bias the position of the connected clamping arms (40, 50) in a closed restraining position. Preferably, the securing means allows the device to remain substantially flush with the mats, and do not substantially protrude upwards or at all, to minimize or eliminate the potential trip hazard. In one embodiment of the device (10), the device (10) is substantially as shown in FIGS. 1A to 1E, 2A to 2D, and 3, and the securing means comprises the configuration of the collar members (42, 52). In one embodiment, the collar members are shaped and positioned to frictionally engage the tubular members when in the closed restraining position. In one embodiment, the collar members may be slightly resiliently flexible so that they can be forced apart to wrap around the tubular members. When the force is released, the collar members (42, 52) elastically spring back towards each other, and thereby clamp against the tubular members.

The clamping effect creates sufficient friction between the concave surfaces (43, 53) and the tubular members to secure the clamping arms (40, 50) in the closed restraining position. In one embodiment, the clamping effect should not be so tight to prevent some relative rotation of the mats in response to dynamic loads on the mats. In one embodiment, the flexibility of the collar members (42, 52) may be sufficient to allow the collar members to be forced apart to wrap around the tubular members by placing the collar members (42, 52) on the tubular members and having a worker kick downwardly on the plates (46, 56) or stand on the plates (46,56). As the downward force impinges the bottom ends of the collar members (42,52) against the tubular member, the bottom ends will tend to slide against the tubular member, spreading apart and then spring back towards each other as the bottom ends wrap around the tubular member. The weight of the clamping arms will also tend to keep the device in the closed position. To release the mats, the collar members (42, 52) may be forced apart from the tubular members and the device opened to its installation position, by hand or by using a tool such as a pry bar.

Figure 1E:
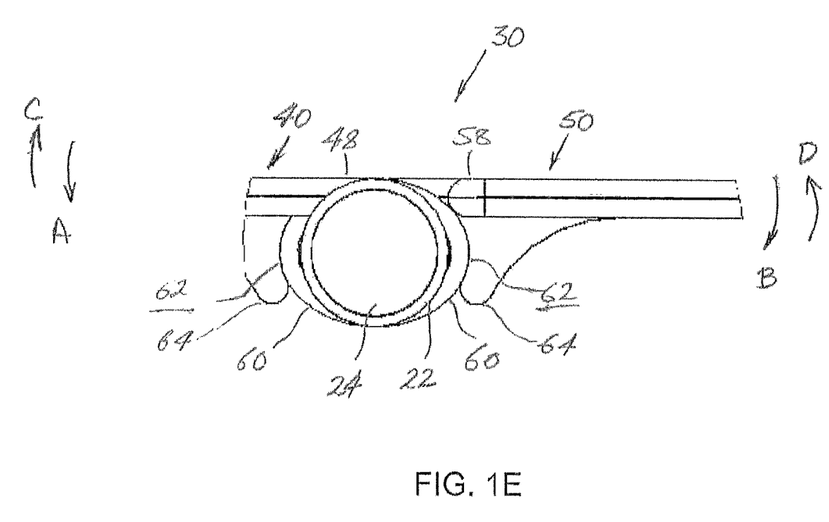
FIG. 1E provides a detailed view of region "A" of FIG. 1C.
Figure 2A:
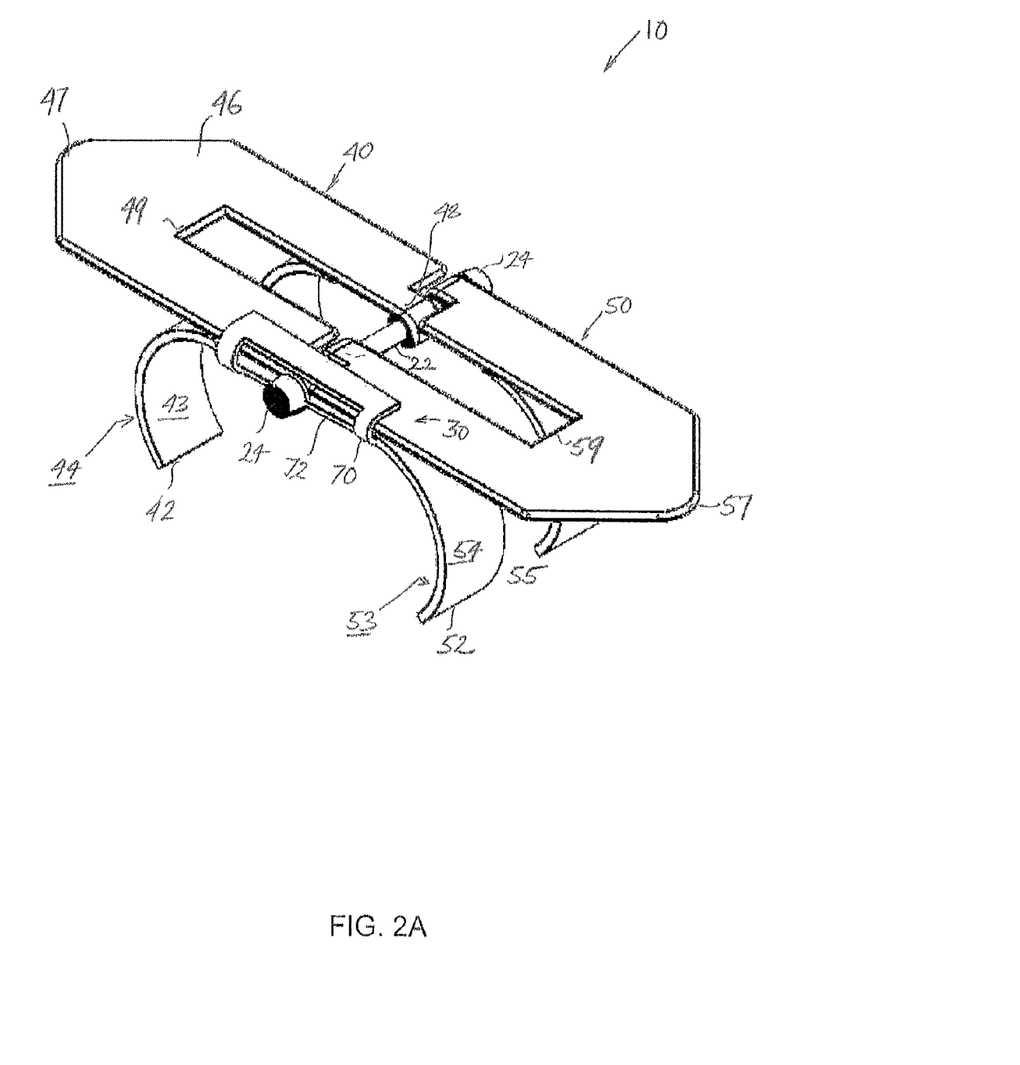
FIGS. 2A, 2B, 2C, and 2D are a perspective view, top view, elevation view, and side view, respectively, of another embodiment of the device of the present invention having securing means in the form of a clip or clamp.
Figure 2B:
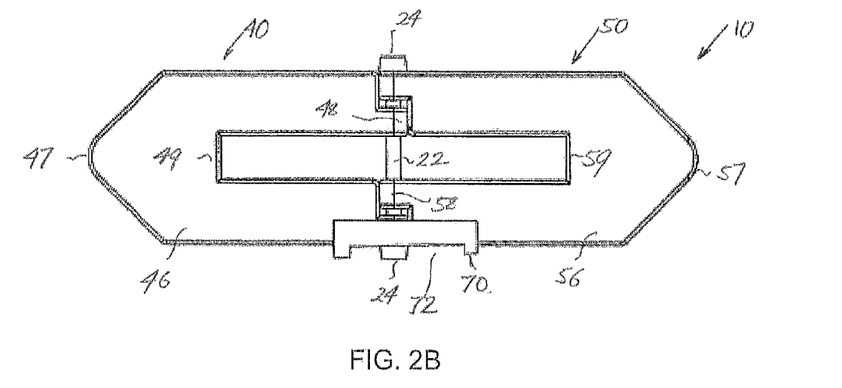
Figure 2C:
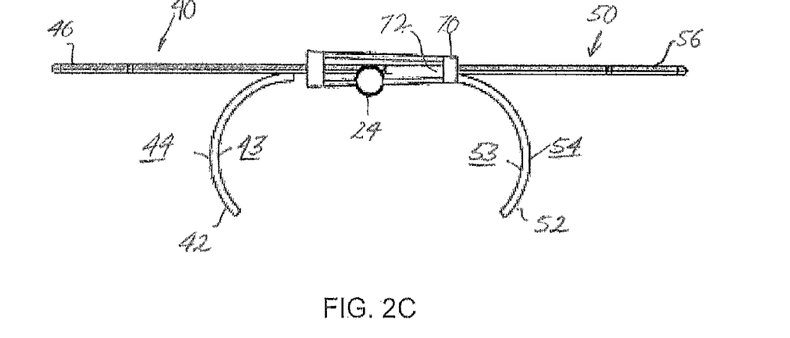
Figure 2D:
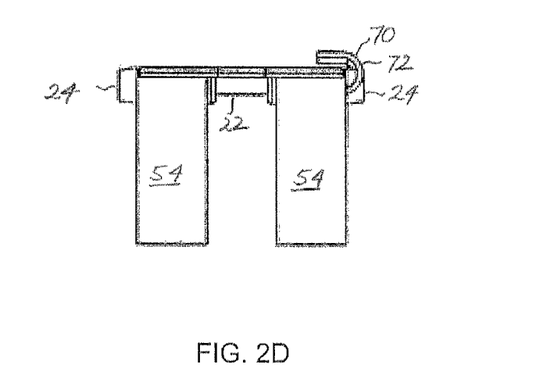

In one embodiment shown in FIG. 1E, the securing means (30) may comprise a cam or cams (60) that are formed on the hinge pin (22), and a groove (62) that is formed in each of clamping arms (40, 50) proximate to the ends (48, 58) of the plates (46, 56). When the clamping arms (40, 50) are pivoted about the hinge pin (22) in the directions of arrows "A" and "B", respectively, towards the closed restraining position, the grooves (62) retain the cams (60), thereby locking the device in the closed restraining position as shown in FIG. 1E. Conversely, when the clamping arms (40, 50) are pivoted about the hinge pin (22) in the directions of arrows "C" and "D", respectively, the grooves (62) release the cams (50), thereby unlocking the device from the closed restraining position. It will be understood that the grooves (62) have flexible flanges (64) that will deform upon a minimum amount of torque is applied to the clamping arms (40, 50) so as to prevent the cams (60) from freely pivoting in or out of the grooves (62).

FIGS. 2A to 2D show another embodiment of the device (10) of the present invention. This embodiment of the device (10) is the same as the embodiment of the device (10) shown in FIGS. 1A to 1D, except that the securing means (30) comprises a clip or a clamp (70). When the device is in the closed restraining position, the clip or clamp (32) mounted over at least a portion of both of the clamping arms (40, 50) in the closed restraining position. The clip or clamp (32) prevents the clamping arms (40, 50) from pivoting about the hinge pin (22) since the tubular members will interfere with the curved collar members (42, 52) and the clamping arms (40, 50) cannot be pivoted relative to each other. In one embodiment, the clip or clamp (32) has an opening (72) that is sized and shaped to permit passage of the hinge pin (22) in the lengthwise direction. In this manner, the hinge pin (22) can be inserted through the opening (34) and retaining caps (24) may be secured to the ends of the hinge pin (22), thereby preventing the clip or clamp (32) from being dismounted from the clamping arms (40, 50). In one embodiment, the hinge pin (22) may spring-loaded to bias the clip or clamp towards the clamping arms (40, 50). That is, the worker may pull the clip or clamp away from the clamping arms (40, 50) to extend the spring-loaded hinge pin (22) to release the clip or clamp, and then release the clip or clamp and allow the spring-loaded hinge pin (22) to pull the clip or clamp back against the clamping arms.

Figure 3:
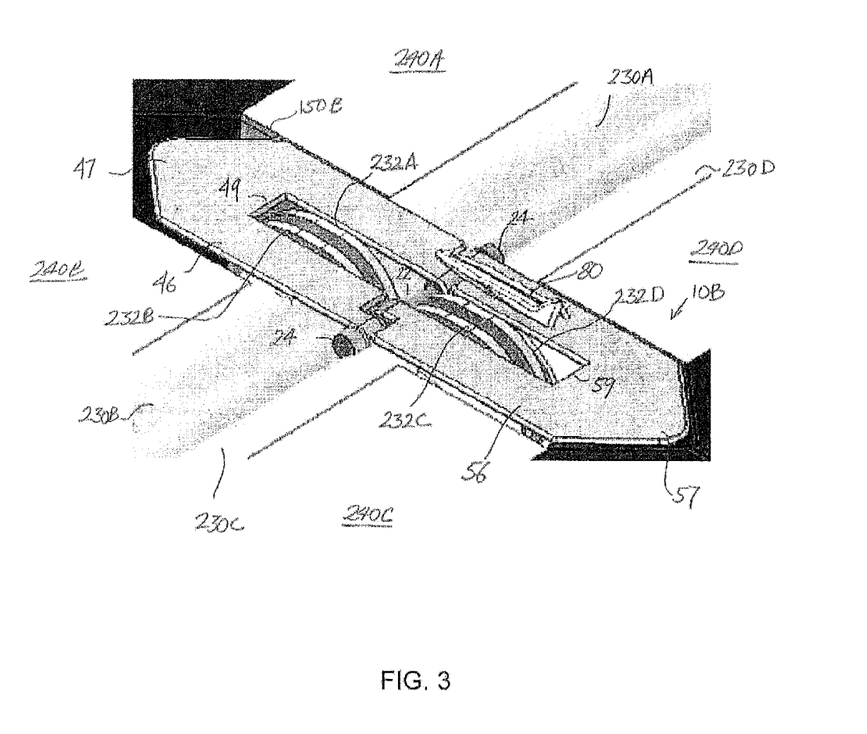
FIG. 3 is a perspective view of another embodiment of the device of the present invention having securing means in the form of a scaffolding pin, in the closed restraining position and interlocking four ground cover mats.

FIG. 3 shows another embodiment of the device (1 OB) of the present invention interlocking four ground cover mats. This embodiment of the device (10B) is the same as the embodiment of the device (10B) shown in FIGS. 1A to 1D, except that securing means (30) comprises a channel formed on each of the clamping arms (80) and a securing member that is slidable through the channels when the clamping arms (40, 50) are in the closed restraining position.

The securing member prevents the clamping arms (40, 50) from pivoting about the hinge pin (22) by interfering with the channel (80). The securing member may comprise any suitably rigid member such as a bolt-like pin or a scaffolding pin.

FIGS. 4 through 7B show different embodiments of the device (10). Like the embodiments of the device (10) shown in FIGS. 1A through 3, these embodiments have clamping arms (40, 50) with collar members (42, 52) and the clamping arms are movable in relation to each other between an open installation position and a closed restraining position. However, these embodiments differ in that clamping members (40, 50) are attached to a plate, instead of comprising a plate.

Figure 4:
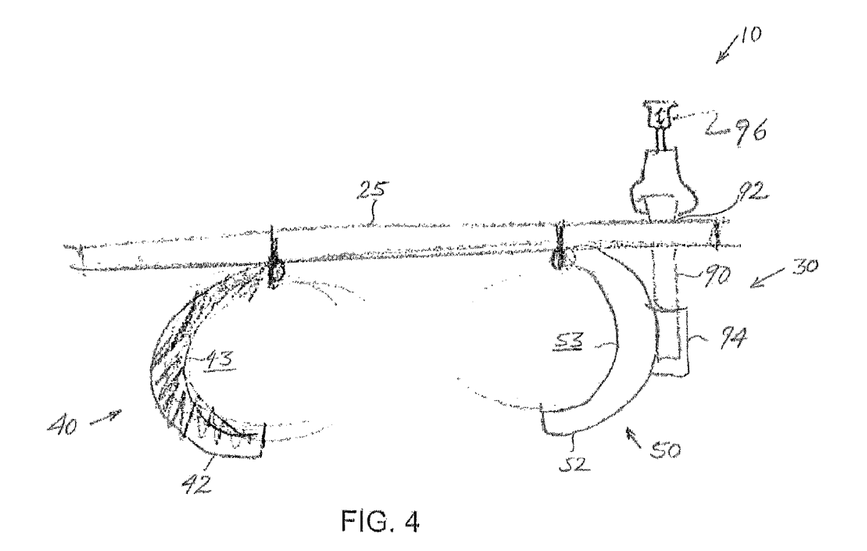
FIG. 4 is a side view of another embodiment of the device of the present invention having securing means in the form of a spring-loaded pin insertable through openings formed in a plate and one of the clamping arms.

FIG. 4 shows another embodiment of the device (10) of the present invention. The first and second clamping arms (40, 50) are slidably connected to a plate (25) for moving the device (10) into the closed restraining position. The securing means (30) comprises a securing member (90), an opening (92) defined by the plate (25), and an opening (94) defined by the clamping arm (50). The securing member (90) may comprise any member that is sized and shaped to insert through both openings (92, 94) when the device (10) is in the closed restraining position. The opening (94) may be either open-ended or a close-ended pocket that limits the passage of the securing member (90). In FIG. 4, the securing member (90) comprises a pin. A spring (not shown) connects the pin (90) and the base (20) and biases the pin (90) downwardly through the openings (92, 94) to prevent the device (10) from being inadvertently dislodged from the closed restraining position. The device (10) can be released from the closed restraining position by pulling upwards on the handle (96) to remove the pin (90) from openings (92, 94).

Figure 5:
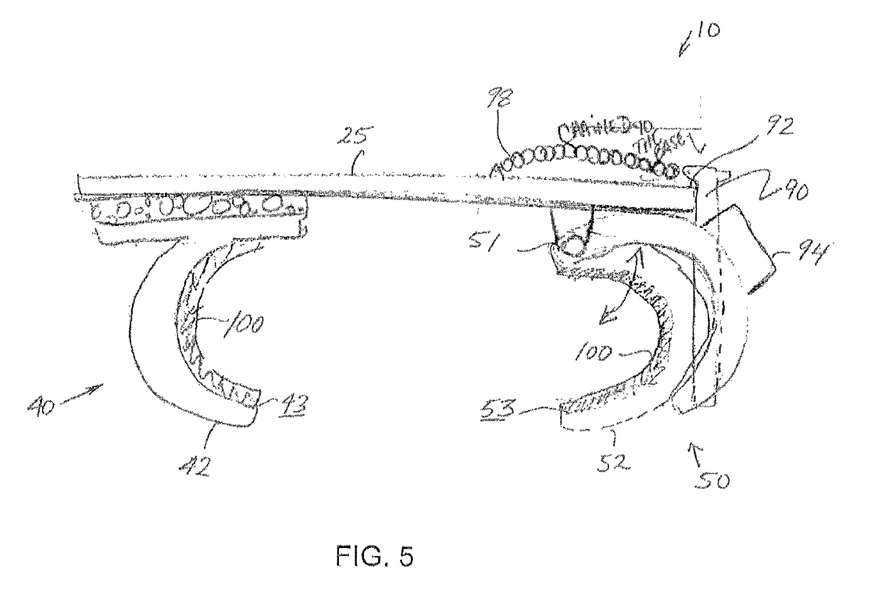
FIG. 5 is a side view of another embodiment of the device of the present invention having securing means in the form of a pin chained to the device and insertable through openings formed in a plate and one of the clamping arms.

FIG. 5 shows another embodiment of the device (10) of the present invention. The first clamping arm (40) is fixed to a plate (25) with a cushioning pad in between. The second clamping arm (50) is pivotally connected to the plate (25) by pin (51). The curved collar members (42, 52) have a cushioning pad (100) along their concave surfaces (43, 53) to prevent the collars from damaging the tubular members. The cushioning pad (100) may be made of any suitably compressible material such as rubber or an elastomeric material. The securing means (30) comprises a securing member (90), an opening (92) defined by the plate (25), and an opening (94) defined by the clamping arm (50). The securing member (90) may comprise any member that is sized and shaped to insert through both openings (92, 94) when the device is in the closed restraining position. The opening (94) may be either open-ended or a closed-ended pocket that limits the passage of the securing member (90). In FIG. 5, the securing member (90) comprises a pin connected to the plate (25) by a chain (98). The pin (90) may be sized to form a friction fit through the openings (92, 94) so that it must be forced through the openings (92, 94) such as by hammering to lock the device in the closed restraining position. The device (10) can be released from the closed restraining position by pulling upwards on the pin (90) with sufficient force to overcome the friction fit to remove the pin (90) from the openings (92, 94).

Figure 6A:
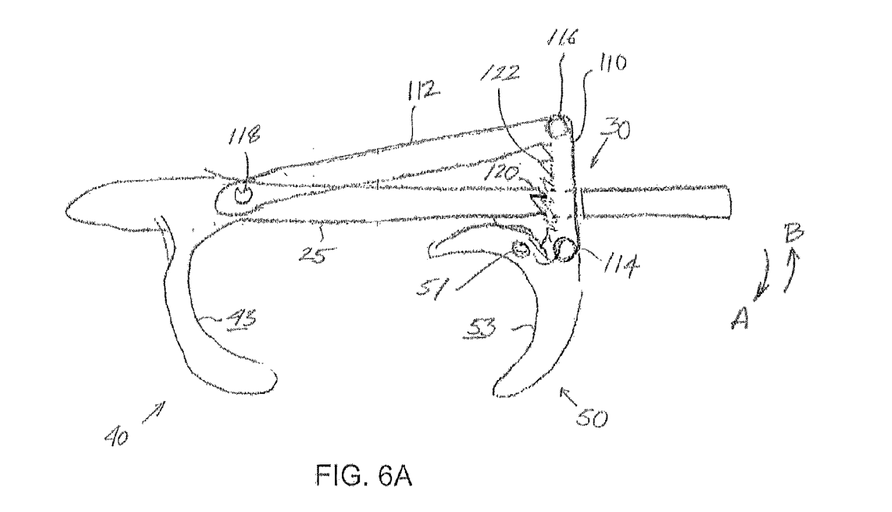
FIGS. 6A and 6B are side views of another embodiment of the device of the present invention having securing means in the form of an angled tooth and a notched plate, in the open installation position and closed restraining position, respectively.
Figure 6B:
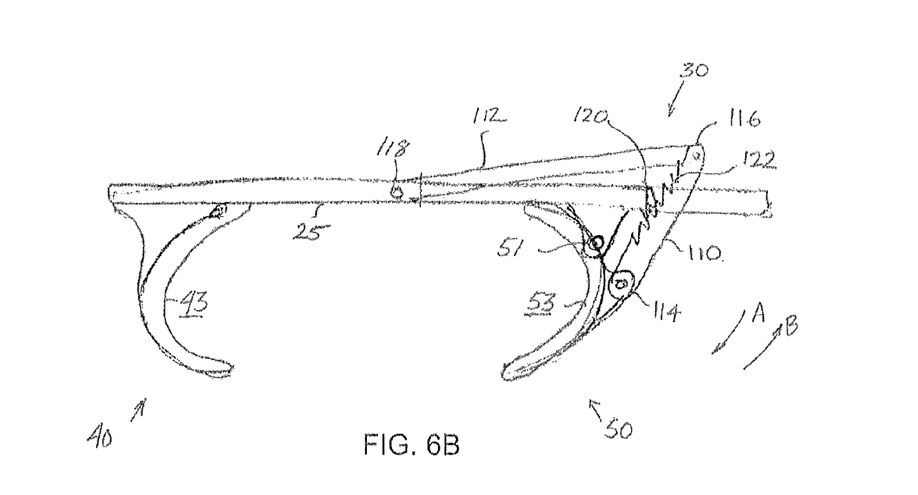

FIGS. 6A and 6B show another embodiment of the device (10) of the present invention, in an open and closed restraining position, respectively. The clamping arm (40) is fixed to and integral with a plate (25). The clamping arm (50) is pivotably connected to the plate (25) by pin (51), and connected to links (110, 112). Link (110) is pivotably attached to the clamping arm (50) by pin (114) and to link (112) by pin (116); and link (112) is pivotably connected to the plate (25) by pin (118). When the device (10) is in the closed restraining position, the link (112) is substantially coplanar with the plate (25). The securing means (30) comprises a notch (120) formed in the plate (25), and a linear rack of angled teeth (122) formed on link (110). The angled teeth (122) have a moderate slope on their bottom side to allow the link (110) to slide downwardly against the notch (120) with relatively little resistance as the clamping arm (50) is rotated in the direction of arrow "A". However, the angled teeth (122) have a steep slope on their top side that engages the notch (120) to prevent the link (110) from sliding upwardly, and hence prevent the clamping arm (50) from rotating in the direction of arrow "B" and releasing from the closed restraining position.

Figure 7A:
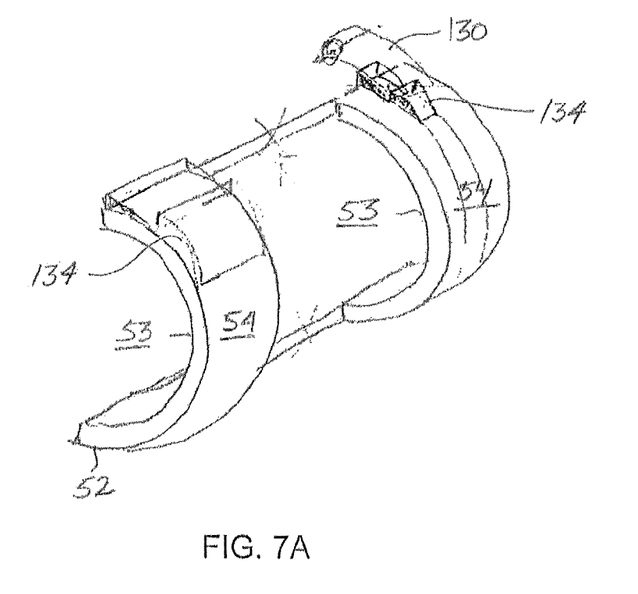
FIGS. 7A and 7B are a perspective view and a side view, respectively, of part of another embodiment of the device of the present invention having securing means in the form of an angled tooth and pawl.
Figure 7B:
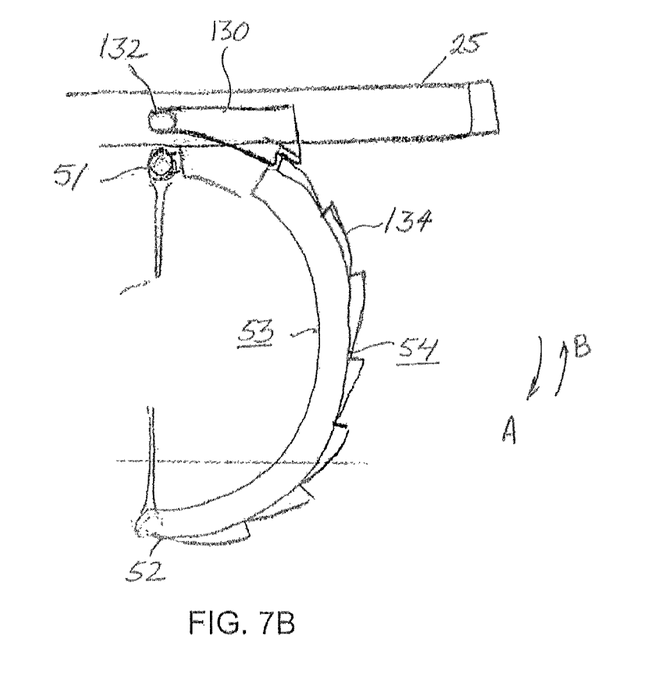

FIGS. 7A and 7B show another embodiment of the device (10) of the present invention. The clamping arm (50) is pivotably connected to a plate (25) by pin (51). The second clamping arm (50) has a convex surface (54). The securing means (30) comprises a pawl (130) connected to the plate (25) by pin (132), and a plurality of angled teeth (134) formed on the convex surface (54). A torsion spring (not shown) biases the pawl (130) towards the angled teeth (134). The angled teeth (134) have a moderate slope on their bottom side to allow the pawl (130) to slide over the teeth with relatively little resistance as the clamping arm (50) is rotated in the direction of arrow "A" towards the closed restraining position. However, the angled teeth (134) have a steep slope on their top side that engages the pawl (130) and prevents the clamping arm (50) from rotating in the direction of arrow "B" and releasing from the closed restraining position. The device (10) can be released from the closed restraining position by lifting the pawl (130) out of engagement with the angled teeth (134).

In one embodiment, the device (10) may be configured to allow some relative movement between adjacent or abutting ground cover mats, to allow for changing dynamic loads on the mats, or uneven terrain beneath the mats. For example, there may be some play allowed between the hinge pin and the first and second clamping arms. The first and second collar members may be somewhat flexibly resilient, or may be mounted in a flexibly resilient manner.

The different means of securing the device in the closed restraining position may be used individually or in combination with each other in different embodiments.

Figure 8A:
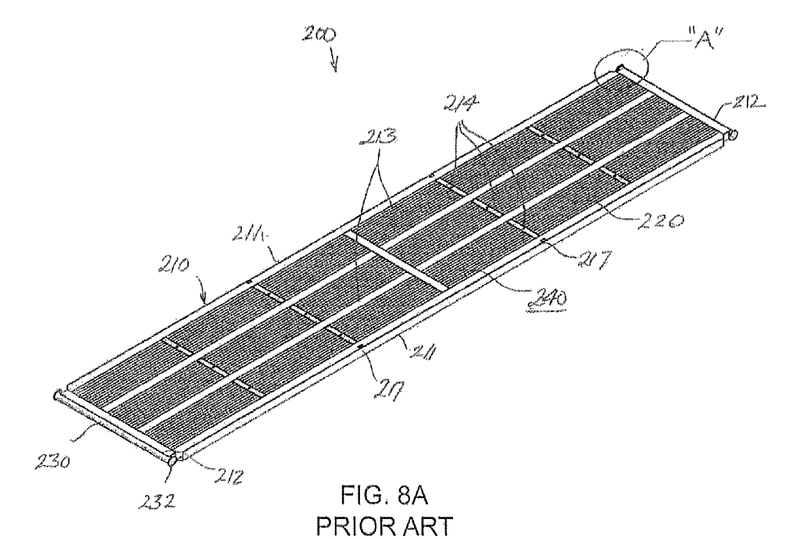
FIG. 8A is a perspective view of a ground mat in the prior art which may be interlocked by a device of the present invention.

The use and operation of the device (10) of the present invention to interlock ground cover mats having tubular members are now described by way of an example. FIG. 8A depicts a conventional ground cover mat (200) as an example of a type of ground cover mat having a tubular member that may be interlocked by the device of the present invention. It will be understood however that the device of the present invention may be used to interlock other a variety of other types of ground cover mats having tubular members, and is not limited to use with the particular ground cover mat (200) illustrated or described.

In general, the ground cover mat (200) comprises a quadrilateral frame (210), a plurality of elongate boards (220), and two tubular members (230). The frame (210) has a perimeter made of two parallel lateral members (211), and two parallel end members (212) disposed perpendicularly to the lateral members (211). The lateral members (211) have openings or passages (217) to receive a chain or cable for lifting the ground cover mat (200). The frame (210) may have an internal structure consisting of mid-rails (213) spanning parallel to the lateral members (211) between the two end members (212), and cross-members (214) spanning parallel to the end members (212) either between a lateral member (211) and a mid-rail (213) or between two mid-rails (213). The members of the frame (210) are made of steel and rigidly welded together. The elongate boards (220) are retained by the members of the frame (210) to form a major surface (240) of the ground cover mat (200). The tubular members (230) are welded to the end members (212), parallel to the end members (212).

Conventionally, each of the tubular members (230) is made of a section of steel pipe having a circular cross-section with an outside diameter approximately equal to the depth of the lateral members (211) and the end members (212).

Figure 8B:
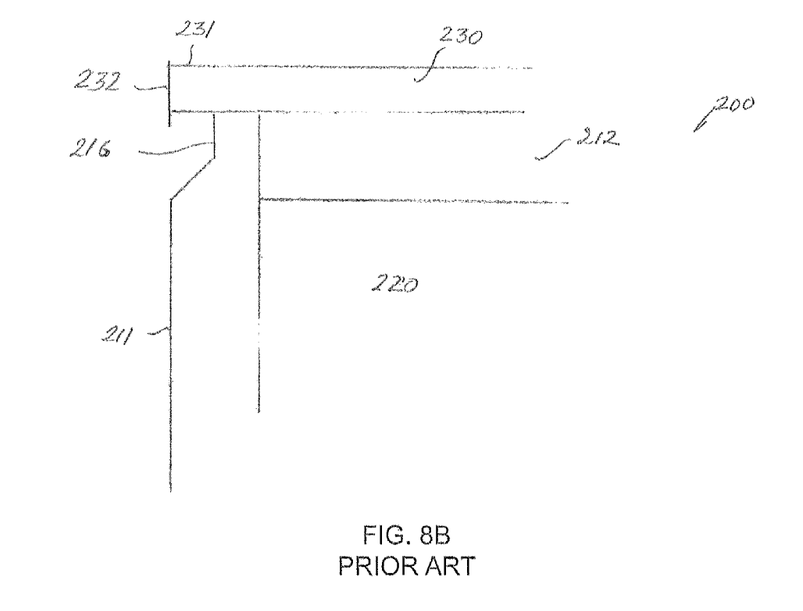
FIG. 8B provides a top view of a typical corner of the mat in region "A" of FIG. 8A.

FIG. 8B provides a detailed view of the corner region "A" of FIG. 8A of the ground cover mat (200) that is typical of the other three corners of the ground cover mat. The narrowed portion (216) of the lateral member (211) proximate to the end member (212) and the tubular member (230) exposes an end portion (231) of the tubular member (230). Further, a vertical flanged cap (232) is attached to each of the ends of the tubular members (230). The flanged cap (232) consists of a circular steel plate having a diameter larger than the outer diameter of the tubular member. The flanged caps prevent a chain or cable looped around the tubular member (230) from sliding off of the tubular member.

Figure 9:
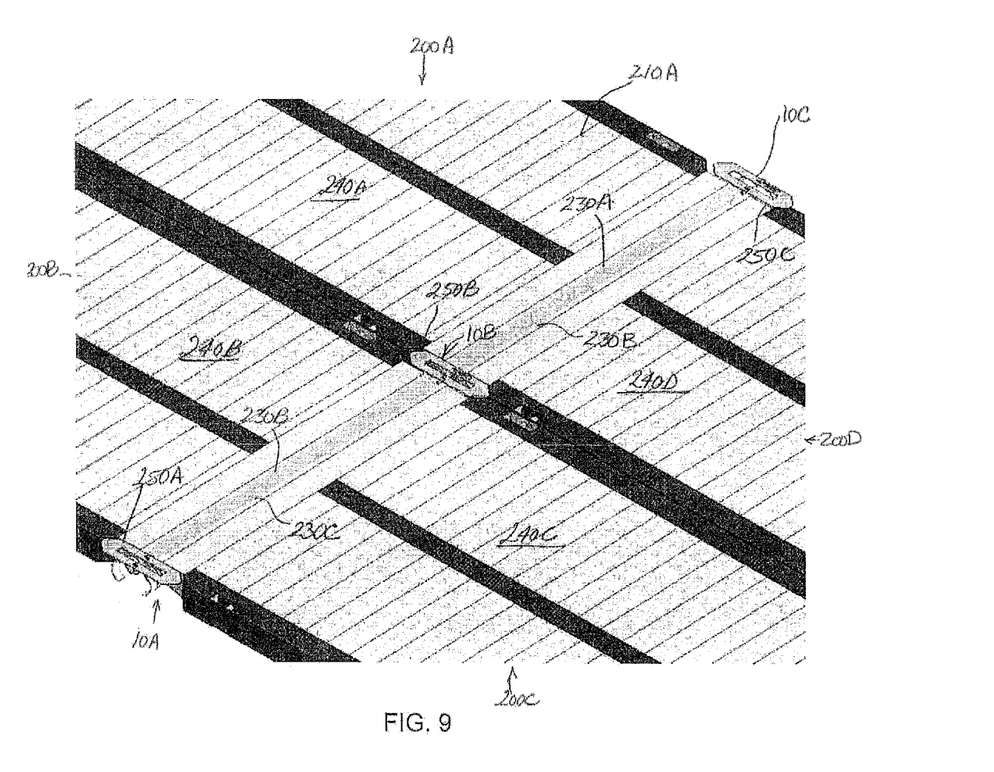
FIG. 9 is a perspective view of embodiments of three devices of the present invention interlocking four ground cover mats.

In order to interlock ground cover mats (200), the ground cover mats are placed on the ground surface in the position in which they are to be interlocked. As an example, FIG. 9 shows four ground cover mats (200A, 200B, 200C, 200D) interlocked in a two-by-two array by three devices (10A, 10B, 10C), The mats are laid down such that the pairs of tubular members (230A, 230D) and (230B and 230C) are substantially coaxial and adjacent each other, while pairs of tubular members (230A, 230B) and (230C, 230D) are parallel to, and abutting each other. Further, the major surfaces (240A, 240B, 240C, 240D) of the mats are substantially coplanar with one another. However, the major surfaces need not be perfectly coplanar and the tubular members need not be perfectly aligned as the devices (10A, 10B, 10C) will preferably accommodate some relative rotation and free play between the mats.

Figure 10:
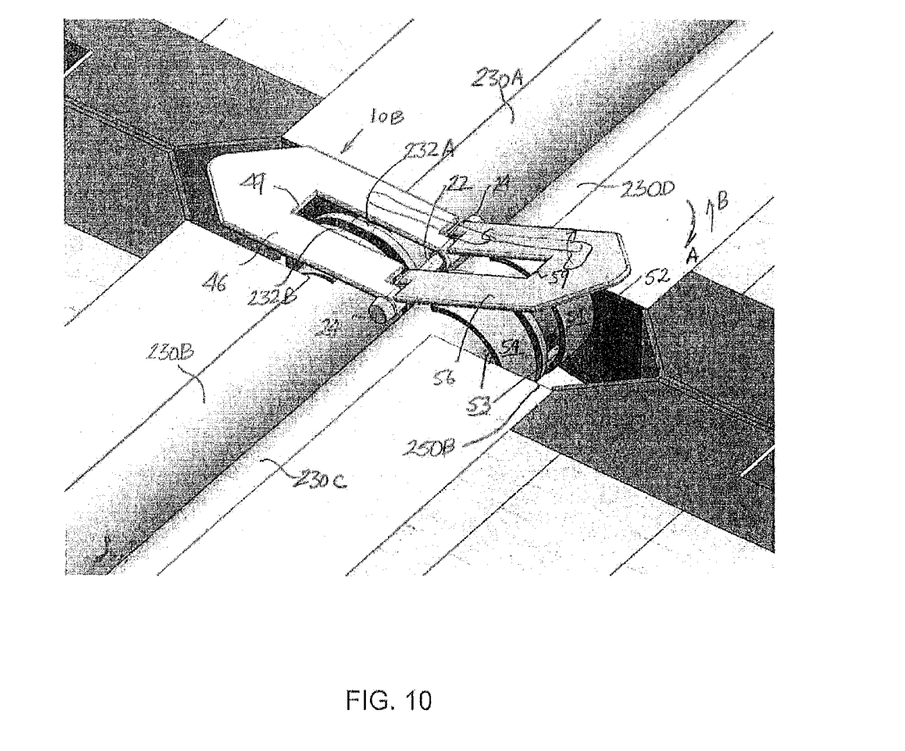
FIG. 10 is a perspective view of one embodiment of the device of the present invention in the open installation position, and interlocking four ground cover mats.

FIG. 10 shows a detailed view of the device (10B) of FIG. 9 in the open installation position. The device (10B) has the embodiment shown in FIG. 3. The device (10B) is positioned so that the concave surface (43) engages tubular members (230A, 230B). The device (10B) is moved into the closed restraining position by pivoting the second clamping arm (50) about hinge pin (22) in the direction of arrow "A" so that the concave surface (53) engages tubular members (230C, 230D).

FIG. 3 shows device (10B) in the closed restraining position connecting four mats. The flanged caps (232A, 232B) pass through the slot (45) in the curved collar member (42) and through the slot (49) of the plate (46). Similarly, the flanged caps (232C, 232D) pass through the slot (55) in the curved collar member (52) and through the slot (59) of the plate (56). In this example, the securing means comprises a scaffolding pin (80) secured over the plates (46, 56). FIG. 9 shows the devices (10A) securing the ground cover mats (200B, 200C), and the device (10C) securing the ground cover mats (200A, 200D) in a similar manner. It will be noted that the plate (46) is substantially coplanar with major surfaces (240A, 240B) and that the plate (56) is substantially coplanar with major surfaces (240C, 240D) and that the plates (46, 56) substantially fill the mat opening (150B) defined by the corners of four adjacent and abutting mats. In this manner, the device (10) and the major surfaces (240A, 240B, 240C, 240D) are substantially continuous, which has the advantage of minimizing tripping hazards that may pose an occupational hazard to workers and surface irregularities that may damage equipment moving over the mats.

When the device (10B) is in the closed restraining position, the ground cover mats (200A, 200B, 200C, 200D) are interlocked with one another. The concave surfaces (43, 53) prevent the ground cover mats (200A, 200B) and ground cover mats (200C, 20D) from being pulled apart vertically or horizontally in the direction parallel to the lateral members (211). The abutting pairs of tubular members (230A, 230D) and (230B, 230C) prevent the ground cover mats (200A, 200B) from being pushed over ground cover mats (200C, 200D) in the direction parallel to the lateral members (211). Further, the passage of the flanged caps (232A, 232B, 232C, 232D) through the slots (45, 55) of the curved collar members (42, 52) and the slots (49, 59) of the plates (46, 56) prevent the ground cover mats (200A, 200B) from being pulled apart from or pushed over the ground cover mats (200C, 200D) in the direction parallel to the end members (212).

Referring back to FIG. 10, the mats (200A, 200B, 200C, 200D) may be detached from each other by first removing the scaffolding pin (80) from the plates (46, 56) of the device (10B). The clamping arm (50) is then pivoted about the hinge pin (22) in the direction of arrow "B" to free the concave surface (53) from tubular members (230C, 230D). The device (10B) may then be lifted away from the ground cover mats. This process is repeated with the other devices (10A, 10C), Cables or chains may then be secured to the openings or passages (217) and looped around the exposed end portions (231) of the ground cover mats so that they can be pulled apart.

Other embodiments of the device (10) as described above shown in FIGS. 1A to 1E, 2, 4, 5, 6A to 6B, and 7A-7B, may be used and operated in a similar manner to the embodiment of the device (10) shown in FIGS. 3, 9 10. In operation, those embodiments of the device (10) will differ principally in the manner in which the clamping arms (40, 50) are adjusted relative to the base (20) towards the closed restraining position of the device (10) and the manner in which the collar members (42, 52) are secured in the closed restraining position.

What is claimed is:

1. An interlocking device for releasably connecting two abutting ground cover mats, each of the mats having a tubular member, the device comprising:
   (a) a first clamping arm comprising a first curved collar member and a first plate;
   (b) a second clamping arm comprising a second curved collar member and a second plate;
   (c) wherein the first and second clamping arms moveably engage each other to move between an open installation position and a closed restraining position where the first and second plates are substantially co-planar with the mats, and the first and second curved collar members are opposed to each other to restrain the tubular members of the adjacent mats; and
   (d) wherein one or both of the first and second clamping arms pivot about a hinge pin comprising a cam which mates with a groove formed in each of the first and second clamping arms, when the first and second clamping arms are pivoted into the closed restraining position, thereby securing the first and second clamping arms in the closed restraining position.

2. The device of claim 1 wherein the first and second curved collar members are configured to engage the tubular members when in the closed restraining position, thereby securing the first and second clamping arms in the closed restraining position.

* * * * *